US008573299B2

(12) United States Patent
Dwarakanath et al.

(10) Patent No.: US 8,573,299 B2
(45) Date of Patent: Nov. 5, 2013

(54) NON-IONIC ALKALI POLYMER SOLUTIONS FOR ENHANCED OIL RECOVERY IN A SUBTERRANEAN FORMATION

(75) Inventors: Varadarajan Dwarakanath, Houston, TX (US); Taimur Malik, Houston, TX (US); Adam Christopher Jackson, Bakersfield, CA (US); Ping Zhao, Katy, TX (US); Oya A. Karazincir, Houston, TX (US); Sophany Thach, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 427 days.

(21) Appl. No.: 12/909,631

(22) Filed: Oct. 21, 2010

(65) Prior Publication Data

US 2012/0097389 A1     Apr. 26, 2012

(51) Int. Cl.
*E21B 43/22* (2006.01)
*C09K 8/584* (2006.01)

(52) U.S. Cl.
USPC ....... 166/270.1; 166/52; 166/275; 166/305.1; 166/400; 507/266; 507/904; 507/936

(58) Field of Classification Search
None
See application file for complete search history.

(56) References Cited

U.S. PATENT DOCUMENTS

| 3,236,303 A | 2/1966 | Csaszar |
| 3,302,713 A | 2/1967 | Ahearn et al. |
| 3,637,017 A | 1/1972 | Gale |
| 3,990,515 A | 11/1976 | Wilchester et al. |
| 4,196,777 A | 4/1980 | Kalfogiou |
| 4,271,907 A | 6/1981 | Gale |
| 4,337,159 A | 6/1982 | Reed et al. |
| 4,359,093 A | 11/1982 | Bernard |
| 4,360,061 A | 11/1982 | Canter et al. |
| 4,458,760 A | 7/1984 | Hurd |
| 4,814,096 A | 3/1989 | Evani |
| 5,167,281 A | 12/1992 | Kalfoglou |
| 6,022,834 A | 2/2000 | Hsu |
| 6,022,843 A | 2/2000 | Shanks et al. |
| 7,183,452 B2 | 2/2007 | Campbell et al. |
| 7,770,641 B2 | 8/2010 | Dwarakanath |
| 7,789,160 B2 * | 9/2010 | Hough et al. ................. 166/371 |
| 2005/0085397 A1 | 4/2005 | Hou et al. |

(Continued)

FOREIGN PATENT DOCUMENTS

EP     0 212 671     3/1987

OTHER PUBLICATIONS

Dwarakanath, et al., "Surfactant Phase Behavior with Field Degreasing Solvent," Environmental Science & Technology, vol. 34, pp. 4842-4848 (2000).

(Continued)

*Primary Examiner* — George Suchfield
(74) *Attorney, Agent, or Firm* — Tiffany E. Weksberg; Craig R. Vander Ploeg (57) ABSTRACT

A method for enhancing oil recovery is disclosed. The method includes providing a subsurface reservoir containing hydrocarbons therewithin and a wellbore in fluid communication with the subsurface reservoir. A solution for injection into the reservoir is formed by mixing a composition with at least one non-ionic chemical, at least one polymer, and at least one alkali. The non-ionic chemical can be alcohol alkoxylates such as alkylaryl alkoxy alcohols or alkyl alkoxy alcohols. The solution is solution is clear and aqueous stable when mixed. The solution is injected through the wellbore into the subsurface reservoir.

29 Claims, 7 Drawing Sheets

(56) References Cited

U.S. PATENT DOCUMENTS

| | | |
|---|---|---|
| 2005/0199395 A1 | 9/2005 | Berger et al. |
| 2006/0014650 A1 | 1/2006 | Campbell et al. |
| 2006/0058199 A1 | 3/2006 | Berger et al. |
| 2009/0107681 A1* | 4/2009 | Hough et al. .............. 166/308.3 |
| 2009/0151941 A1* | 6/2009 | Dwarakanath et al. ..... 166/270.1 |
| 2011/0220353 A1* | 9/2011 | Bittner et al. .............. 166/270.1 |

OTHER PUBLICATIONS

A.H. Falls et al., "Field Test of Cosurfactant-Enhanced Alkaline Flooding," SPE Reservoir Engineering, vol. 9, No. 3, pp. 217-223 (Aug. 1994).

Jayanti, et al., "Laboratory Evaluation of Custom-designed Surfactants to Remediate NAPL Source Zones," Environmental Science & Technology, vol. 36, pp. 5491-5497 (2002).

D.B. Levitt, et al., "Identification and Evaluation of High-Performance EOR Surfactants," SPE/DOE Symposium on Improved Oil Recovery (SPE 100089), Apr. 22-26, 2006, Tulsa, Okla., USA, 2006.

A. Pandey, "Refinement of Chemical Selection for the Planned ASP Pilot in Mangala Field—Additional Phase Behavior and Coreflood Studies," SPE Oil and Gas India Conference and Exhibition (SPE 129064), Jan. 20-22, 2010, Mumbai, India.

A. Pandey, et al., "Design of an ASP Pilot for the Mangala Field: Laboratory Evaluations and Simulation Studies," 2008 Indian Oil and Gas Technical Conference and Exhibition (SPE 113131) Mar. 4-6, 2008, Mumbai, India.

L.A. Verkruyse et al., "Potential Use of Non-ionic Surfactants in Micellar Flooding," Int'l Symposium on Oilfield and Geothermal Chemistry (SPE 13574), Apr. 9-11, 1985, Phoenix, Arizona, USA (1985).

PCT International Search Report regarding PCT/US2011/051307 dated Feb. 2, 2012 (3 pgs).

* cited by examiner

NON-IONIC ALKALI POLYMER SOLUTIONS FOR ENHANCED OIL RECOVERY IN A SUBTERRANEAN FORMATION

TECHNICAL FIELD

This disclosure is directed to recovery of oil from subterranean petroleum reservoirs.

BACKGROUND

Crude oil production from subterranean reservoirs may involve use of various flooding methods as the natural forces that are used in the "primary recovery" process become depleted. A large portion of the crude oil may have to be driven out of the formation in "secondary" or "tertiary" recovery processes. In addition, some reservoirs may not have sufficient natural forces for oil production even by primary recovery processes. Enhanced oil recovery methods are one example of such recovery processes used to improve the production of crude oil.

Currently, the petroleum industry is re-evaluating technologies that will improve the ability to recover remaining and untapped oil from the subterranean reservoirs. Injecting a displacing fluid or gas may begin early, long before the complete depletion of the field by primary recovery processes. Methods for improving displacement efficiency or sweep efficiency may be used at the very beginning of the first injection of a displacing fluid or gas, rather than under secondary and tertiary recovery conditions.

The easiest method of flooding a subterranean reservoir for the production of crude oil is by injecting a liquid or a gas into the well to force the oil to the surface. Water flooding is the most widely used fluid. However, water does not readily displace oil because of the high interfacial tension between the two liquids, which results in high capillary pressure that traps the oil in porous media.

The addition of chemicals to the flooding liquid has been used to modify early flooding techniques in order to improve the oil recovery. Surfactants are one class of chemical compounds that have been used in aqueous media for enhanced oil recovery. Surfactants have been found to effectively lower the interfacial tension between oil and water and enable mobilization of trapped oil through the reservoir.

Surfactants have been used in flooding operations, alone, or in conjunction with secondary surfactants or co-surfactants and/or sacrificial agents. Surfactants, such as alkylaryl sulfonates, are able to lower the interfacial tension between oil and water, and when used in conjunction with appropriate amounts of other inorganic salts, such as, sodium chloride or sodium carbonate, they exhibit desirable phase behavior. Depending on the molecular weight and molecular weight distribution, branching and point of attachment of the aryl group to the alkyl groups, alkylaryl sulfonates can be tailored to preferentially reside in the aqueous or oleic phases at different electrolyte concentrations (salinities). At low salinities the alkylaryl sulfonates reside in water and at high salinities they partition into the oil. In either case, the swollen micellar solutions that contain surfactants, oil, and water are termed microemulsions. At "optimal salinity" an equal volume of oil and water are solubilized in the microemulsion. For well tailored and matched surfactants, the high volumes of oil and water solubilized in the microemulsion result in ultra-low interfacial tensions that provide potential for high oil recovery from reservoirs.

The salinity of the water in subterranean hydrocarbon reservoirs may vary a great deal. For example, the Minas oil field in Indonesia has total dissolved salts of between 0.2 and 0.3 weight percent. Other reservoirs may have salinities as high as or higher than 20.0 percent sodium chloride and over 0.5 percent calcium chloride and magnesium chloride. It is desirable to optimize the surfactant for enhanced oil recovery for a particular reservoir by evaluating tailored versions of the surfactants with native reservoir brine and reservoir oil under subterranean reservoir conditions via phase behavior experiments. In addition to the phase behavior experiments, interfacial tension measurements can be taken, such as by using a spinning drop tensiometer, to verify that the interfacial tensions are acceptably low. In addition to testing the surfactants in the laboratory, additional field or pilot tests with injected solutions can be performed as in some instances the injectate brine is different from native reservoir brines.

Surfactants can be optimized by adjusting the molecular weight and/or molecular weight distribution of the surfactant to maximize the amount of oil in the aforementioned microemulsion. Other components may also be used in combination with the surfactant, such as inorganic alkaline salts, co-solvents, polymeric materials, and co-surfactants to improve phase behavior. The performance of an enhanced oil recovery formulation may also be measured by the oil solubilization parameter, which is the volume of oil dissolved per unit volume of surfactant. The square of oil solubilization value is inversely proportional to interfacial tension. In addition, the performance can also be measured by the ability of the formulation to achieve stable microemulsions and low interfacial tensions rapidly, such as in less than one day in the laboratory.

In the past, minimal attention has been paid to aqueous stability. During the London floods, another operator achieved aqueous stability of the surfactant-polymer formulation, but did not consider the interactions with the chase solutions. Similarly, during the surfactant field trial in Minas in 2002, there was not an importance placed upon aqueous stability, which was a contributing factor to lower than anticipated oil recovery.

A number of published reports have discussed methods for enhanced oil recovery using flooding with anionic surfactant systems. These systems depend on ion exchange to shift the salinity/ionic strength to a region of optimal oil recovery potential. These systems are marginally phase-stable or unstable mixtures after (or even before) injection into the formation and produce less than optimum oil recovery. Some systems use solvents such as alcohols or miscible solvents that help keep the components as a single phase. Others have incorporated an oil in the surface mixture that is higher in molecular weight than the oil that is meant to be recovered from the formation. This approach forms a micro-emulsion and a less than optimum mixture at surface conditions. In addition to the phase stability problems associated with anionic surfactant systems, the costs of the systems are often not economically viable due to the high chemical costs.

There is limited research on the use of non-ionic surfactants in enhanced oil recovery operations, and actual attempts to use non-ionic surfactants in such operations have failed to produce successful results. For example, non-ionic surfactants have been used as the main component in a surfactant flood, but have not shown to improve recovery. See e.g. "Potential Use of Non-ionic Surfactants in Micellar Flooding," L. A. Verkruyse and S. J. Salter, Int'l Symposium on Oilfield and Geothermal Chemistry (SPE 13574), 9-11 Apr. 1985, Phoenix, Ariz., USA (1985).

SUMMARY

According to an aspect of the present invention, a method for enhancing oil recovery is disclosed. The method includes providing a subsurface reservoir containing hydrocarbons therewithin and a wellbore in fluid communication with the subsurface reservoir. A solution for injection into the reservoir is formed by mixing a composition with at least one non-ionic chemical, at least one polymer, and at least one alkali. The solution is solution is clear and aqueous stable when mixed. The solution is injected through the wellbore into the subsurface reservoir.

In one embodiment, the solution comprises from about 0.05 to about 1.00 percent by weight non-ionic chemical based on the total weight of the solution. In one embodiment, the solution comprises from about 0.1 to about 0.3 percent by weight non-ionic chemical based on the total weight of the solution. In one embodiment, the solution is free of anionic surfactant. In one embodiment, the solution has a PV×C×10,000 from about 3 to about 15 units, where PV represents a dimensionless fraction of pore volumes injected, C represents a mass fraction of the non-ionic chemical, and 10,000 represents an arbitrary conversion factor. In one embodiment, the solution has a PV×C×10,000 from about 5 to about 10 units.

In one embodiment, the non-ionic chemical is a non-ionic surfactant. In one embodiment, the non-ionic chemical is an alcohol alkoxylate. For example, the non-ionic chemical can be alkylaryl alkoxy alcohols, alkyl alkoxy alcohols, or a combination thereof.

In one embodiment, a salinity of the solution is optimized for the subsurface reservoir by adjusting a number of alkoxylate groups in the non-ionic chemical.

In one embodiment, a chelating agent is added to the solution. For example, the chelating agent can be ethylenediaminetetraacetic acid (EDTA).

In one embodiment, the solution has a cloud point temperature higher than the temperature within the subsurface reservoir.

In one embodiment, the solution has a salt tolerance of at least 1.25 times the optimal salinity with alkali at a water-oil ratio of 9:1.

In one embodiment, the solution has an interfacial tension (IFT) less than about 0.005 dynes/cm.

In one embodiment, the wellbore is an injection wellbore associated with an injection well. A production well is spaced-apart from the injection well a predetermined distance and has a production wellbore in fluid communication with the subsurface reservoir. The injection of the solution increases the flow of the hydrocarbons to the production wellbore.

In one embodiment, the solution remains clear upon entering the subsurface reservoir.

In one embodiment, a chaser slug is injected after injecting the solution.

Another aspect of the present invention includes a method for enhancing oil recovery from a subsurface reservoir that is in fluid communication with an injection well and a production well. The method includes forming a clear and aqueous stable solution for injection into the reservoir by mixing a composition including at least one non-ionic chemical, at least one polymer, and at least one alkali. The solution is injected through the injection well into the subsurface reservoir, and oil present in the subsurface reservoir is recovered by the production well.

In one embodiment, the non-ionic chemical is a non-ionic surfactant. In one embodiment, the non-ionic chemical is an alcohol alkoxylate. For example, the non-ionic chemical can be alkylaryl alkoxy alcohols, alkyl alkoxy alcohols, or a combination thereof.

Another aspect of the present invention includes a system for enhancing oil recovery from a subsurface reservoir. The system includes a subsurface reservoir containing hydrocarbons therewithin and a wellbore in fluid communication with the subsurface reservoir. The system also includes a clear and aqueous stable solution for injection into the reservoir including at least one polymer, at least one alkali, and at least one non-ionic chemical. The non-ionic chemical can be alkylaryl alkoxy alcohols, alkyl alkoxy alcohols, or a combination thereof.

In one embodiment, the system includes a production well in fluid communication with the subsurface reservoir for recovering the hydrocarbons in the subsurface reservoir.

DETAILED DESCRIPTION

Definitions

As used herein, the following terms have the following meanings unless expressly stated to the contrary:

The term "non-ionic chemical" as used herein refers to the non-ionic surfactant that is present in the formulation, such as, alkylaryl alkoxy alcohols, alkyl alkoxy alcohols, alkyl alkoxylated esters, and alkyl polyglycosides.

The term "alkali metal" as used herein refers to Group IA metals of the Periodic Table.

The term "alkali" or "alkaline" as used herein refers to a carbonate or hydroxide of an alkali metal that is present in the formulation, such as alkali metal carbonate, bicarbonate or hydroxide salts.

The terms "enhanced oil recovery" or "EOR" as used herein refer to processes for enhancing the recovery of hydrocarbons from subterranean reservoirs.

The term oil solubilization parameter "SPo" refers to the volume of oil dissolved per unit volume of surfactant. Typically, oil solubilization parameter is measured via phase behavior experiments.

The term "interfacial tension" or "IFT" as used herein refers to the surface tension between test oil and water of different salinities containing a surfactant formulation at different concentrations. Typically, interfacial tensions are measured using a spinning drop tensiometer or calculated from phase behavior experiments.

The term "co-solvent" as used herein refers to alcohols, ethers and/or a range of non-ionic materials. Generally the non-ionic materials have a somewhat higher tolerance to polyvalent ions, are water-soluble, and may also provide a reduction in viscosity of the surfactant formulation.

Unless otherwise specified, all percentages are in weight percent and the pressure is in atmospheres.

This disclosure relates to Enhanced Oil Recovery ("EOR") systems and methods. A general treatise on enhanced oil recovery is Basic Concepts in Enhanced Oil Recovery Processes edited by M. Baviere (published for SCI by Elsevier Applied Science, London and New York, 1991).

Figure 1:
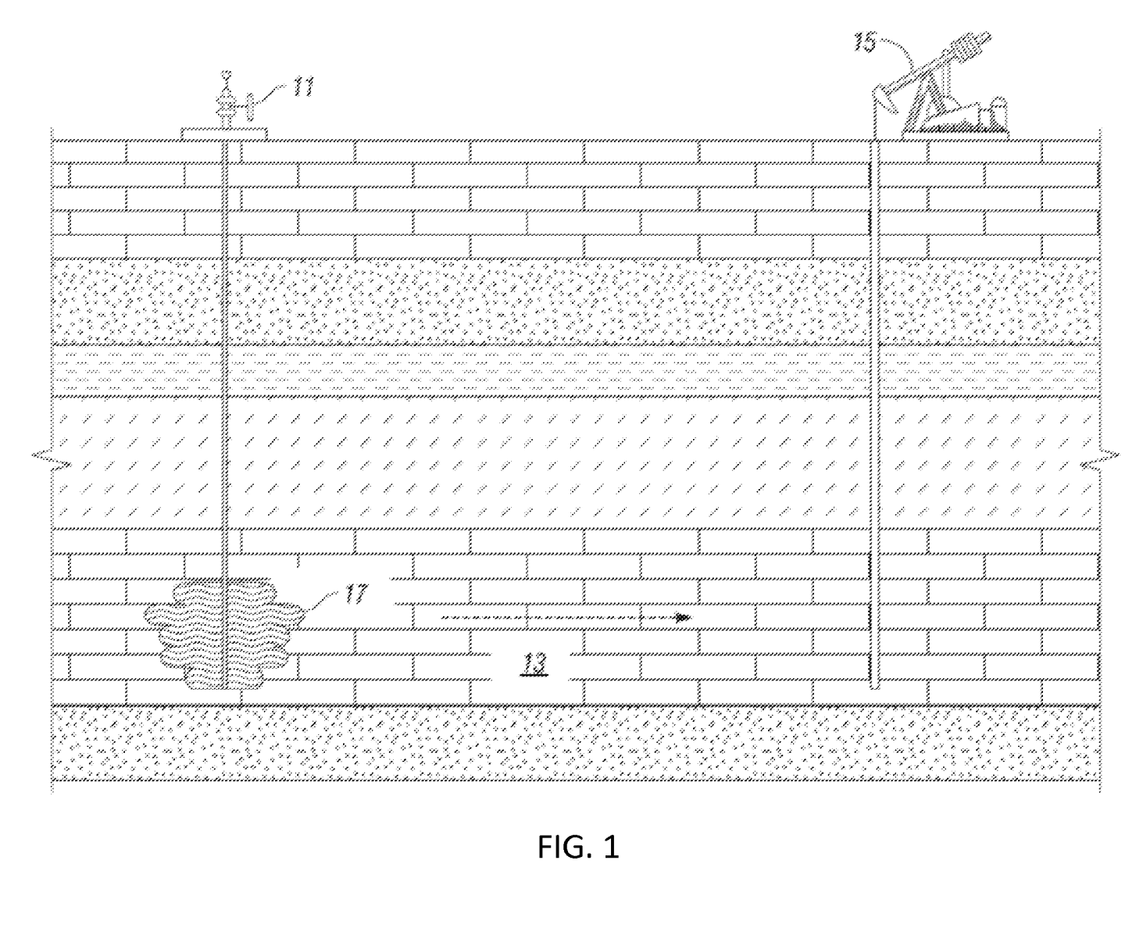
FIG. 1 is a schematic sectional view of an example oil recovery system that includes a reservoir that is in fluid communication with an injection well and a production well during enhanced oil recovery operations, in accordance with an embodiment of the present invention.

Referring to FIG. 1, an example oil recovery system includes injection well 11 that is illustrated extending to a portion of subsurface reservoir 13 which contains hydrocarbons for production, such that injection well 11 is in fluid communication with subsurface reservoir 13 and the hydrocarbons. Production well 15 is also in fluid communication with reservoir 13 in order to receive the hydrocarbons therefrom. Production well 15 is positioned a predetermined lateral distance away from injection well 11. For example, production well can be positioned between 100 feet to 10,000 feet away from injection well 11. As will be readily appreciated by those skilled in the art, there can be additional injection wells 11 and production wells 15, such that production wells 15 are spaced apart from injection wells 11 at predetermined locations to optimally receive the hydrocarbons being pushed through reservoir 13 due to injections from injection wells 11.

A solution or slug 17 is injected through injection well 11 into reservoir 13. As will be described in further detail below, the formulation of slug 17 comprises a non-ionic chemical, a polymer, and an alkali. Slug 17 disperses through reservoir 13, with at least a portion thereof proceeding toward production well 15. The alkali in slug 17 penetrates into pore spaces of the formation contacting the trapped oil globules and reacts with the acidic moieties of the oil creating natural soap. The soap, which acts as a surfactant and is the primary driver for oil recovery, reduces the interfacial tension (IFT) between the water and oil in the reservoir allowing the trapped oil to escape from the pore spaces in the reservoir rock. The soap also can alter the wettability of the reservoir rock, as well as, help with reducing the adsorption of the non-ionic chemical by the reservoir rock. The non-ionic chemical is used in slug 17 for phase behavior control thus optimizing the oil recovery and making it more robust. The non-ionic chemical also helps in releasing the oil trapped in the pore spaces of the rock by further reducing the interfacial tension between the water and oil in the reservoir. The polymer acts as a viscosity modifier, thereby reducing channeling and helping to mobilize or drive the oil to production well 15.

In some embodiments, slug 17 is a clear, aqueous stable solution. In particular, the non-ionic chemical is compatible with the alkali and polymer used in slug 17 such that a homogenous and phase stable solution is produced. Slug 17 is a true solution that is free of suspended particles, rather than being a mixture that separates into multiple phases over time. Accordingly, slug 17 can be characterized as being free of large micelles that interfere with the passage of light which make the solution hazy or opaque. Slug 17 is most effective in enhanced oil recovery when it has a balanced solubility in oil and water. These true aqueous stable solutions are contrasted with prior surfactant-polymer (SP) or alkali-surfactant-polymer (ASP) solutions used in chemical flooding of a reservoir which have been historically hazy and/or translucent and/or opaque.

These prior solutions typically utilized ionic surfactants in combination with a co-solvent or mixed ionic, non-ionic surfactant solutions. When at their optimum temperature and salinity, these surfactant solutions exist more as a dispersion of relatively large micelles or other large aggregates, and typically separate into two or more phases (layers) upon standing. Furthermore, the size of these micelles approaches the wavelengths of light and thus, interferes with the passage of light and makes the solutions hazy. Although the surfactant solutions may exhibit very good interfacial properties, the surfactant-polymer (SP) or alkali-surfactant-polymer (ASP) formulations must propagate for distances on the order of 100-600 ft depending on well spacing. Over such distances, the hazy solutions tend separate into different layers that may go different places in the formation. The suspended droplets also might get filtered out by the porosity of the reservoir.

Figure 2A:
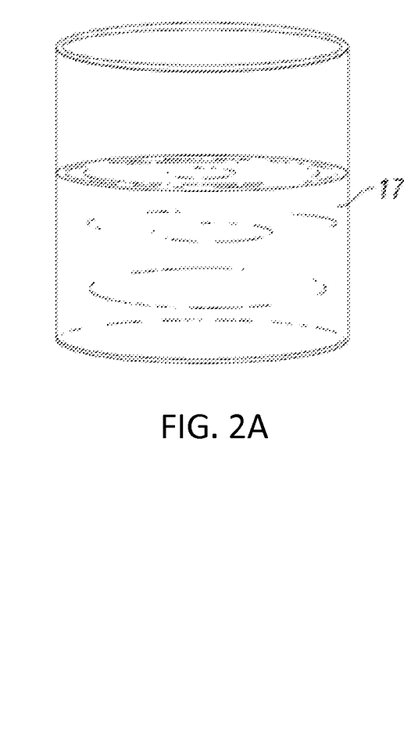
FIG. 2A is side view of a surfactant-polymer solution for use in the enhanced oil recovery operations of FIG. 1.
Figure 2B:
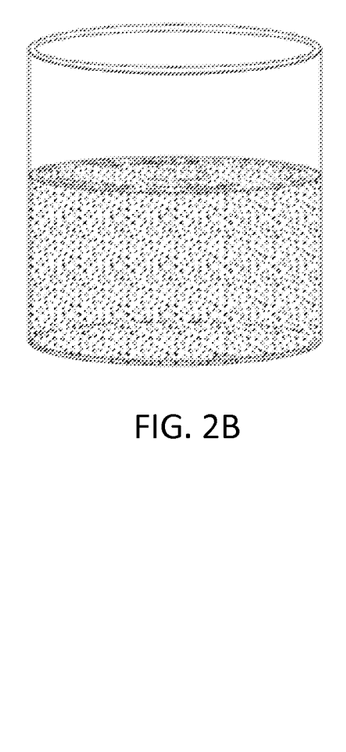
FIG. 2B is a side view of a chemical solution for use in the enhanced oil recovery operations.

Referring to FIGS. 2A and 2B, a comparison is illustrated between solution or slug 17 (FIG. 2A) and a prior surfactant-polymer (SP) or alkali-surfactant-polymer (ASP) solution (FIG. 2B) having micelles or aggregates with a large size. As is readily apparent to those skilled in the art, the micelles associated with solution or slug 17 are small enough such that they do not interfere with the passage of light, especially when heated to the temperature of reservoir 13, and thus appear transparent or clear. In an embodiment, slug 17 is a pure solution without particles floating therein, or having large micelles or large aggregates associated therewith, such that slug 17 does not interfere with the passage of light at room temperature.

Figure 2C:
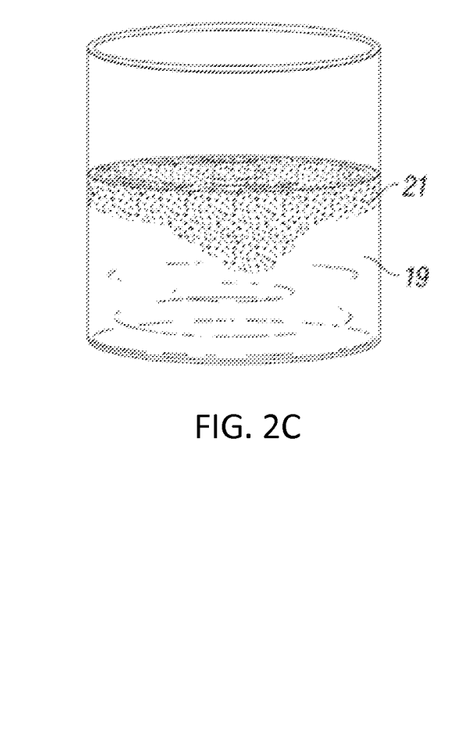
FIG. 2C is a side view of the chemical solution of FIG. 2B after a period of twenty-four hours.

FIG. 2C, is an example of the "hazy" solution from FIG. 2B will typically separate into multiple phases 19, 21 after twenty-four (24) hours. Slug 17 is stable and therefore, does not separate into multiple phases over time.

Referring back to FIG. 1, slug 17 is clear and aqueous stable, which means that surfactant-polymer slug 17 does not separate prior to or while propagating the porous medium of reservoir 13. The incorporation of a non-ionic chemical allows the solution to be clear and phase stable at a lower surface temperature, but then shift the balance of the hydrophile/lypophile of the surfactant to the optimum conditions once in the reservoir. By retaining the single-phase quality, slug 17 can more efficiently act as a detergent to reduce the surface tension of the oil/hydrocarbons and wash the hydrocarbons out of the pore spaces within reservoir 13. By being more efficient, slug 17 can also act upon hydrocarbons more effectively that are farther away from injection well 11.

The non-ionic chemical, polymer, and alkali used in the formulation of slug 17 are described below in further detail.

Non-Ionic Chemicals

Despite previous failures to use non-ionic chemicals, such as non-ionic surfactants, in enhanced oil recovery operations, the inventors have unexpectedly discovered that non-ionic chemicals can be used to successfully improve recovery oil in a flooding process. In an embodiment, the non-ionic chemicals or surfactants such as non-ionic alcohols, non-ionic esters, or a combination thereof, are incorporated into non-ionic, alkali-polymer formulations to make them homogeneous solutions for easier and more effective field injection.

The selection of the non-ionic chemical depends on the total acid number (TAN), crude-oil composition in the reservoir, and the compatibility with the make-up or injection brine used in slug 17. Standard phase-behavior tests must be conducted to screen for appropriate non-ionic chemicals. To reduce the number of candidate non-ionic chemicals for the phase-behavior screen, the following guidelines can be used.

The non-ionic chemicals should be soluble in the make-up or injection brine used to make slug 17. Generally, this implies that the HLB (Hydrophillic-Lipophillic-Balance) for the non-ionic chemical must be fairly high, such as greater than 10 (HLB>10). The cloud point (CP) for the non-ionic chemical should also be above both surface temperatures, which typically range between 0 and 100 Degrees Celsius, and reservoir temperatures, which typically range between 30 and 150 Degrees Celsius. The cloud point is the temperature above which the non-ionic chemical becomes insoluble in the make-up or injection brine. In particular, it is the temperature at which the non-ionic chemical becomes hydrophobic enough to separate from the aqueous solution, thus becoming a colloidal suspension or macroemulsion. The lowest interfacial tensions are usually at or near this temperature point. The hydrophobicity of non-ionic chemical generally increases with temperature. The non-ionic chemical may also be selected so that at a cooler surface temperature it imparts high water solubility and salt tolerance to the non-ionic solution or slug 17.

Non-ionic chemicals or surfactants satisfying the above guidelines generally have the following characteristics. The lipophilic moiety (tail) is an alkyl chain with typically more than six (6) carbons, with or without an aromatic ring (phenyl) attached to it. This chain may be linear or branched. In some embodiments, C8 to C9 (or C8-Φ to C9-Φ) are effective alkyl chains for the non-ionic chemicals. The hydrophyllic moiety is an ethoxy (EO), propoxy (PO) or butoxy (BO) chain with more than two repeating units of EO, PO, or BO. In some embodiments, more than six (6) repeating units, such as EO, are present. In some embodiments, more than ten to twenty repeating units, such as EO, are present.

Because the particular makeup of the non-ionic, alkali-polymer solution is dependent on the characteristics of the subterranean formation and fluid therewithin, further testing of the solution is often performed using oil from the formation for which the solution will be injected into. In particular, additional phase-behavior tests using actual crude oil and injection brine at reservoir temperature are utilized for selecting the appropriate non-ionic chemical that will be used for enhanced oil recovery of a particular reservoir. Based on the results of these tests, the non-ionic chemical and other components of the solution can be optimized. Examples of screening processes are disclosed in "Refinement of Chemical Selection for the Planned ASP Pilot in Mangala Field—Additional Phase Behavior and Coreflood Studies," A. Pandey, SPE Oil and Gas India Conference and Exhibition (SPE 129064), 20-22 Jan. 2010, Mumbai, India, which is incorporated herein by reference; "Design of an ASP Pilot for the Mangala Field: Laboratory Evaluations and Simulation Studies," A. Pandey, D. Beliveau, D. Corbishley, and M. S. Kumar, 2008 Indian Oil and Gas Technical Conference and Exhibition (SPE 113131) 4-6 Mar. 2008, Mumbai, India, which is incorporated herein by reference; and A. H. Falls, et al. "Field Test of Cosurfactant-Enhanced Alkaline Flooding," SPE Reservoir Engineering, August 1994, which is incorporated herein by reference.

Example non-ionic chemicals or surfactants include alcohol alkoxylates such as alkylaryl alkoxy alcohols or alkyl alkoxy alcohols. Currently available alkoxylated alcohols include Lutensol® TDA 10EO and Lutensol® OP40, which are manufactured by BASF SE headquartered in Rhineland-Palatinate, Germany. Neodol 25, which is manufactured by Shell Chemical Company, is also a currently available alkoxylated alcohol. Chevron Oronite Company LLC, a subsidiary of Chevron Corporation, also manufactures alkoxylated alcohols such as L24-12 and L14-12, which are twelve-mole ethoxylates of linear carbon chain alcohols. Other non-ionic surfactants can include alkyl alkoxylated esters and alkyl polyglycosides. In some embodiments, multiple non-ionic surfactants such as non-ionic alcohols or non-ionic esters are combined. In some embodiments, the surfactants are non-halogenated or non-fluorinated. In some embodiments, the non-ionic surfactant consists of molecules of carbon, hydrogen, and oxygen atoms. In some embodiments, the non-ionic surfactant has a number average molecular weight of 500 with a range of preferred embodiments of 400 to 600.

The non-ionic, alkali-polymer solution may include from about 0.05 to about 1.0 percent by weight non-ionic chemical based on the total weight of non-ionic, alkali-polymer solution. For example, the non-ionic, alkali-polymer solution may include from about 0.075 to about 0.5, or about 0.2 to about 0.8, or about 0.1 to about 0.3 percent by weight non-ionic chemical based on the total weight of the non-ionic, alkali-polymer solution.

The composition of the non-ionic, alkali-polymer solution may also be represented by the expression $PV \times C \times 10,000$ equals about 3 to about 15 units. PV represents a dimensionless fraction of pore volumes (Volume/Volume) injected into the reservoir, C represents a mass fraction of the non-ionic chemical, and 10,000 is an arbitrary conversion factor used to make the unit values greater than or equal to one. $PV \times C \times 10,000$ may also equal about 5 to about 10 units, about 3.5 to about 6.5 units, or about 6 to about 12 units. The pore volume fraction component may vary from about 0.05 to about 0.5, such as about 0.1 to about 0.3, or about 0.3 to about 0.4. The mass fraction of the non-ionic chemical (C) may vary from about 0.05 to about 10, such as about 0.075 to about 0.5, or about 0.2 to about 0.8, or about 0.1 to about 0.3 percent.

The Alkali

The alkali employed is a carbonate or hydroxide of an alkali metal from Group IA metals of the Periodic Table, such as an alkali metal salt. In an embodiment, the alkali metal salt is a base, such as an alkali metal hydroxide, carbonate or bicarbonate, including, but not limited to, sodium carbonate, sodium bicarbonate, sodium hydroxide, potassium hydroxide, or lithium hydroxide. Sodium chloride can also be used. The alkali is typically used in amounts ranging from about 0.3 to about 3.0 weight percent of the solution, such as about 0.5 to about 0.85 wt. %.

As previously discussed, the alkali in slug 17 penetrates into pore spaces of the reservoir rock contacting the trapped oil globules. High acidic concentrations in the oil drive in situ saponification where the alkali and acidic components of the oil react to create natural soap, which the primary driver for oil recovery. The soap reduces the interfacial tension (IFT) between the water and oil in the reservoir allowing the trapped oil to escape from the pore spaces in the reservoir rock.

The Polymer

Polymers, such as those commonly employed for enhanced oil recovery, may be included to control the mobility of the injection solution. Such polymers include, but are not limited to, xanthan gum, partially hydrolyzed polyacrylamides (HPAM) and copolymers of 2-acrylamido-2-methyl-propane sulfonic acid and/or sodium salt and polyacrylamide (PAM) commonly referred to as AMPS copolymer. Molecular weights (Mw) of the polymers range from about 10,000 daltons to about 20,000,000 daltons, such as about 100,000 to about 500,000, or about 300,000 to 800,000 daltons. Polymers are used in the range of about 250 ppm to about 5,000 ppm, such as about 500 to about 2500 ppm concentration, or about 1000 to 2000 ppm in order to match or exceed the reservoir oil viscosity under the reservoir conditions of temperature and pressure. Examples of polymers include Flopaam™ AN125 and Flopaam™ 3630S, which are produced by and available from SNF Floerger, headquartered in Andrézieux, France.

The Formation of Slug

As discussed in reference to FIG. 1, the non-ionic, alkali-polymer solution or slug 17 used in flooding techniques for enhanced oil recovery in reservoirs comprises a non-ionic chemical, an alkali, and a polymer in an aqueous solution. Typically, the aqueous solution comprises from about 500 to about 10,000 ppm total dissolved solids, such about 2,000 to about 8,000 ppm, about 1,000 ppm to about 5,000 ppm, or about 5,000 to about 9,500 ppm. The optimal composition of the non-ionic alkali polymer solution will vary based on the nature of the oil that is being recovered and the nature of reservoir that it is being recovered from. Furthermore, the non-ionic chemical varies with each formation/oil type and is tailored in terms of the number of alkoxy groups, such as EO, PO, or BO repeating units. Depending upon the reservoir salinity, temperature and oil composition the non-ionic chemical will have different HLB's (Hydrophilic-Lipophilic-Balance) as a result of varying alkoxy groups. The amounts of the components may be according to the ranges listed above for each component.

For each reservoir operation, an optimal salinity can be determined, and slug 17 can be mixed in order to work most effectively at that salinity. Such methods for achieving optimal salinity are described and taught by "Identification and Evaluation of High-Performance EOR Surfactants," D. B. Levitt, A. C. Jackson, C. Heinson, L. N. Britton, T. Malik, V. Dwarakanath, and G. A. Pope, SPE/DOE Symposium on Improved Oil Recovery (SPE 100089), 22-26 Apr. 2006, Tulsa, Okla., USA, 2006. In an embodiment, the non-ionic alkali polymer solution may have a salt tolerance of at least 1.25 times the optimal salinity with alkali at a water-oil ratio of 9:1. The formulation of slug 17 is typically responsive to the amount of electrolytes associated with the reservoir and/or the water (mixing with produced water or fresh).

In an embodiment, the non-ionic alkali polymer solution will exhibit a cloud point temperature higher than surface temperatures and the temperatures within the subsurface reservoir for which it is to be injected. For example, the cloud point temperature may be between 0 and 150 Degrees Celsius.

In an embodiment, the non-ionic chemical will exhibit a high HLB (Hydrophillic-Lipophillic-Balance) to account for the reservoir salinity, temperature and oil composition. For example, the HLB may be greater than ten.

In an embodiment, the non-ionic alkali polymer solution creates in-situ soap, such that the interfacial tension (IFT) between the water and oil in the reservoir is less than about 0.005 dynes/cm, such as in a range of about 0.005 to about 0.0001 dynes/cm, about 0.004 to about 0.001 dynes/cm, or about 0.003 to about 0.0005 dynes/cm.

Figure 3:
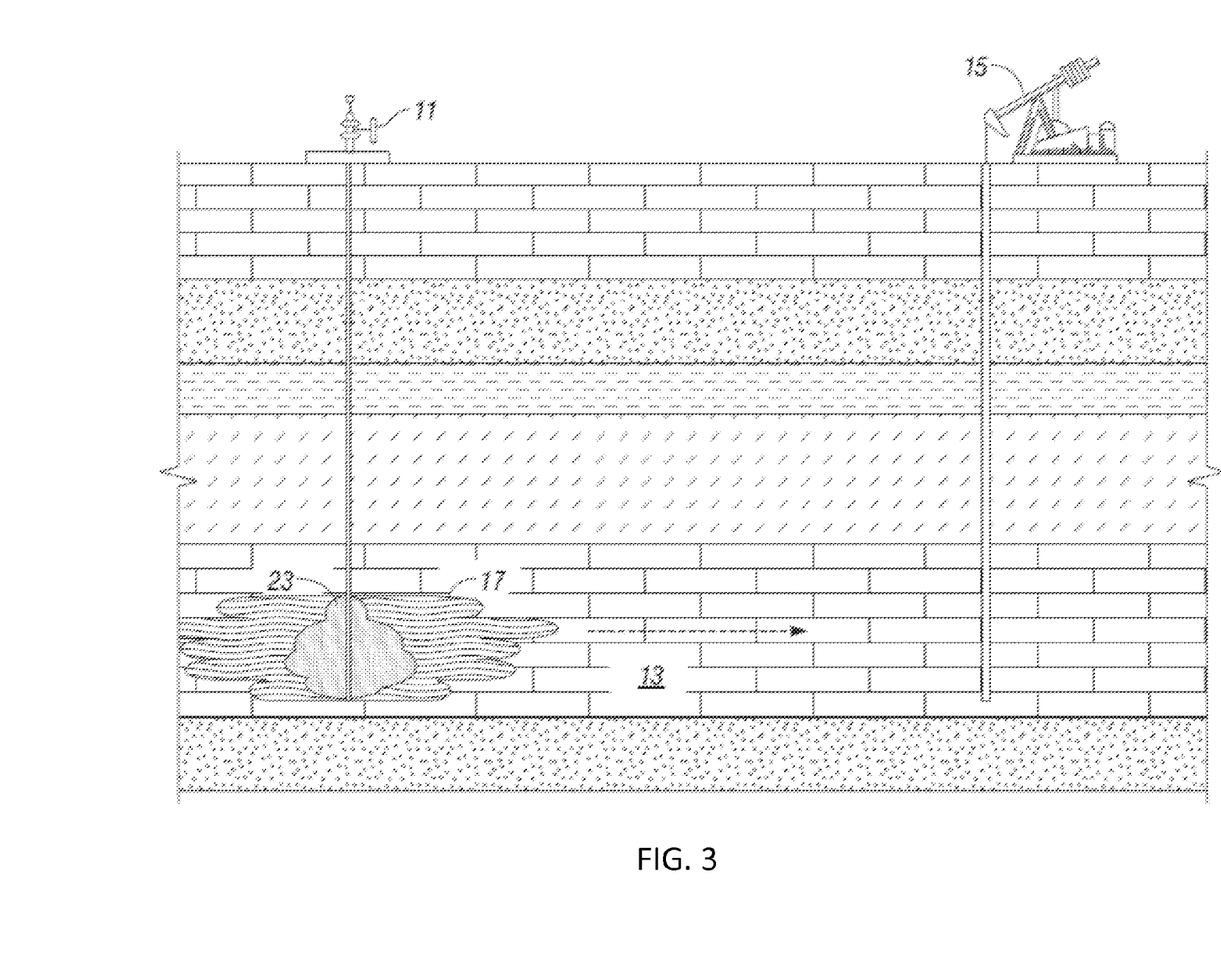
FIG. 3 is a schematic sectional view of an example oil recovery system that includes a reservoir that is in fluid communication with an injection well and a production well during enhanced oil recovery operations, in accordance with an embodiment of the present invention.

Referring to FIG. 3, a driver or chaser slug 23 is injected through injection well 11 into reservoir 13 to displace the previously injected fluids such as slug 17. In one embodiment, chaser slug 23 contains polymer in order increase pressure to drive or push the hydrocarbons, which are typically in the form of a microemulsion at this point, toward production well 15. The polymer used in chaser slug 23 can be the same polymer used in slug 17, or a different polymer. Examples of polymers for chaser slug 23 include Flopaam™ AN125 and Flopaam™ 3630S. In one embodiment, multiple chaser slugs 23 can be injected. For example, a first chaser slug 23 containing a small amount of polymer can be injected and then followed by a second chaser slug 23 containing a larger amount of polymer.

In some embodiments, slug 17, chaser slug 23, or a combination thereof, can include a chelant or chelating agent. Chelants may be used to complex with the alkali metal and soften the water in the solution. The salinity of the non-ionic alkali polymer solution may be optimized for the particular subterranean reservoir by adjusting a number of chelating ligands in the chelating agent, such as alkoxylate groups if the chelant is EDTA ("ethylenediaminetetraacetic acid"). EDTA is just one example of a suitable chelant, another example of a chelant is MGDA ("methylglycinediacetic acid"). Typically chelants are only utilized to handle hard brines. The amount of chelant in the non-ionic, alkali-polymer solution may be selected based on the amount divalent ions in the solution. For example, chelating agents can be used at 1:1 molar ratio with divalent cations such as calcium ($Ca^{2+}$) or magnesium ($Mg^{2+}$). Other chelating agents may work depending on the brine composition and the desired pH. However, many inorganic chelating agents, once complexed with divalent ions, have poor water solubility.

In some embodiments, slug 17, chaser slug 23, or a combination thereof, can also include a secondary surfactant or co-surfactant, and a co-solvent. Secondary surfactants and co-solvents are optional, and typically no secondary surfactant or co-solvents are included. Furthermore, the non-ionic, alkali-polymer solution can be free of anionic surfactant. The optional secondary surfactant can be an ionic surfactant and may, for example, have the general formula:

wherein $R_1$ is hydrogen or an alkyl group containing from about 1 to 3 carbon atoms; $R_2$ is hydrogen or an alkyl group having from about 1 to 3 carbon atoms; $R_3$ is an alkyl group having from about 8 to about 60 carbon atoms, and M is a mono-valent cation. In one embodiment, M is an alkali metal, ammonium, or substituted ammonium.

Examples of substituted ammonium include ammonium independently substituted with from about 1 to about 4 aliphatic or aromatic hydrocarbyl groups having from about 1 to about 15 carbon atoms, such as alkyl, aryl, alkaryl and aralkyl, and optionally having one or more heteroatoms, such as nitrogen, oxygen or sulfur, which may be present in aliphatic or aromatic heterocyclic rings. Examples of suitable heterocyclic ring substituents include pyrrole, pyrrolidine, pyridine, pyrimidine, pyrazole, imidazole and quinoline. The heterocyclic ring substituent may be substituted on the ammonium moiety through a carbon atom in the heterocyclic ring, such as in a C-pyridyl-substituted ammonium, or, alternatively, the quaternary ammonium nitrogen itself may be a nitrogen atom in the heterocyclic ring, such as in a pyridinium ion.

In one embodiment, $R_1$ and $R_2$ are methyl and the alkylaromatic moiety is alkylxylene. For example, the alkylxylene moiety is alkyl-ortho-xylene.

In another embodiment, the alkylaromatic moiety is alkyl-meta-xylene.

An example secondary anionic surfactant is an alkylaromatic sulfonate salt obtained by the alkylation of an aromatic compound. In an embodiment, the aromatic compound is benzene, toluene, xylene, or mixtures thereof, such as toluene, xylene, or mixtures thereof. If xylene is employed, the xylene compound may comprise ortho-, meta-, or para-xylene, or mixtures thereof.

Typically, the aromatic compound is alkylated with a mixture of normal alpha olefins (NAO's) containing from C8-C60 carbon atoms, C10-050 carbon atoms, or from C12-C40 carbon atoms to yield an aromatic alkylate. The alkylate is sulfonated to form an alkylaromatic sulfonic acid which is then neutralized with caustic thereby producing a sodium alkylaromatic sulfonate compound. For example, the alkylate may be made by the alkylation of ortho-xylene which produces an alkylate containing several isomers, but in which at least 90 wt. % of the alkylate is the 1,3,4-ring attachment structure, having 40 to 60 wt. % 2-alkyl attachment to the aromatic ring (i.e., wherein the longest alkyl chain is attached to the aromatic ring at the 2-position on the alkyl chain), such as about 45 to about 55 wt. % 2-alkyl attachment, or about 50 wt. % 2-alkyl attachment to the aromatic ring. The alkylate may contain from about 1 to about 20 wt. % dialkylate species, such as less than about 10 wt. % dialkylate species. In an embodiment, at least about 95 wt. % or at least about 98 wt. % of the alkylate contains the 1,3,4-ring attachment structure. Upon sulfonation of the alkylate, a mixture of alkylaromatic sulfonic acid isomers are formed and the isomer may be the 2-alkyl-4,5-dimethyl benzene sulfonic acid isomer where the amount of this sulfonic acid isomer is present in an amount of from about 1 to about 90 wt. %, such as in an amount of from about 10 to about 80 wt. %, or in amount of at least about 70 wt. %.

At least one aromatic compound or a mixture of aromatic compounds may be used for the alkylation reaction. In an embodiment, the at least one aromatic compound or the aromatic compound mixture comprises at least one of monocyclic aromatics, such as benzene, toluene, xylene, cumene or mixtures thereof. For example, the at least one aromatic compound or aromatic compound mixture is xylene, including all isomers (i.e., meta ortho- and para-), and mixtures thereof.

The at least one aromatic compound or the mixture of aromatic compounds is commercially available or may be prepared by methods that are well known in the art.

The olefins employed to make the example anionic surfactant may be derived from a variety of sources. Such sources include the normal alpha olefins, linear alpha olefins, isomerized linear alpha olefins, dimerized and oligomerized olefins, and olefins derived from olefin metathesis. Another source from which the olefins may be derived is through cracking of petroleum or Fischer-Tropsch wax. The Fischer-Tropsch wax may be hydrotreated prior to cracking Other commercial sources include olefins derived from paraffin dehydrogenation and oligomerization of ethylene and other olefins, methanol-to-olefin processes (methanol cracker) and the like.

In one embodiment, the aromatic compound may be alkylated with a mixture of normal alpha olefins (NAOs) containing from C8-C60 carbon atoms, such as from C10-050 carbon atoms, or from C12-C40 carbon atoms to yield the primary surfactant alkylate.

The normal alpha olefins employed to make the secondary surfactant are commercially available or may be prepared by methods that are well known in the art.

The olefins may be linear, isomerized linear, branched or partially branched. The olefin may be a single carbon number olefin, or it may be a mixture of linear olefins, a mixture of isomerized linear olefins, a mixture of branched olefins, a mixture of partially branched olefins, or a mixture of any of the foregoing.

The olefins may selected from olefins with carbon numbers ranging from about 8 carbon atoms to about 60 carbon atoms. The olefins may be selected from olefins with carbon numbers ranging from about 10 to about 50 carbon atoms, such as from about 12 to about 40 carbon atoms.

In another embodiment, the olefin or the mixture of olefins is selected from linear alpha olefins or isomerized olefins containing from about 8 to about 60 carbon atoms. For example, a mixture of olefins is selected from linear alpha olefins or isomerized olefins containing from about 10 to about 50 carbon atoms. In an embodiment, the mixture of olefins is selected from linear alpha olefins or isomerized olefins containing from about 12 to about 40 carbon atoms.

The mixture of branched olefins may be selected from polyolefins which may be derived from C3 or higher monoolefins (i.e., propylene oligomers, butylenes oligomers, or co-oligomers etc.). For example, the mixture of branched olefins is either propylene oligomers or butylenes oligomers or mixtures thereof.

The linear olefins that may be used for the alkylation reaction may be one or a mixture of normal alpha olefins selected from olefins having from about 8 to about 60 carbon atoms per molecule. For example, the normal alpha olefin is selected from olefins having from about 10 to about 50 carbon atoms per molecule. In an embodiment, the normal alpha olefin is selected from olefins having from about 12 to about 40 carbon atoms per molecule.

In one embodiment, the normal alpha olefins are isomerized using a solid or a liquid acid catalyst. A solid catalyst may have at least one metal oxide and an average pore size of less than 5.5 angstroms. In an embodiment, the solid catalyst is a molecular sieve with a one-dimensional pore system, such as SM-3, MAPO-11, SAPO-11, SSZ-32, ZSM-23, MAPO-39, SAPO-39, ZSM-22 or SSZ-20. Other possible acidic solid catalysts useful for isomerization include ZSM-35, SUZ-4, NU-23, NU-87 and natural or synthetic ferrierites. These molecular sieves are well known in the art and are discussed in Rosemarie Szostak's Handbook of Molecular Sieves (New York, Van Nostrand Reinhold, 1992) which is herein incorporated by reference for all purposes. A liquid type of isomerization catalyst that can be used is iron pentacarbonyl (Fe(CO)$_5$).

Methods for synthesizing such surfactants are disclosed in U.S. 2009/0151941, which is incorporated herein by reference.

An example of a secondary surfactant for slug 17 is "CS2000A," which is produced by and available from Chevron Oronite Company LLC.

In another embodiment, the non-ionic alkali polymer solution may also contain a secondary surfactant with the general formula:

$$R_4\text{—}SO_3X$$

wherein R4 is an aliphatic hydrocarbyl group having from about 12 to about 40 carbon atoms, and having from about 20 to 98 weight percent branching, and containing one or more olefin or alcohol moieties or mixtures thereof; and X is a mono-valent cation. In one embodiment, X is an alkali metal, ammonium or substituted ammonium.

Examples of substituted ammonium include ammonium independently substituted with from about 1 to about 4 aliphatic or aromatic hydrocarbyl groups having from about 1 to about 15 carbon atoms, such as alkyl, aryl, alkaryl and aralkyl, and optionally having one or more heteroatoms, such as nitrogen, oxygen or sulfur, which may be present in aliphatic or aromatic heterocyclic rings. Examples of suitable heterocyclic ring substituents include pyrrole, pyrrolidine, pyridine, pyrimidine, pyrazole, imidazole and quinoline. The heterocyclic ring substituent may be substituted on the ammonium moiety through a carbon atom in the heterocyclic ring, such as in a C-pyridyl-substituted ammonium, or, alternatively, the quaternary ammonium nitrogen itself may be a nitrogen atom in the heterocyclic ring, such as in a pyridinium ion.

The secondary surfactant may be an isomerized olefin sulfonate (IOS) made by the sulfonation of an isomerized alpha olefin (IAO) in which the IAO is made by the isomerization of C12-C40 normal alpha olefins (NAO), such as C20-C28 normal alpha olefins, or C20-C24 normal alpha olefins.

In one embodiment, $R_4$ is derived from a partially isomerized alpha olefin containing a residual alpha olefin content.

The IAO comprises from about 12 to about 40 carbon atoms, such as from about 20 to about 28 carbon atoms, or from about 20 to about 24 carbon atoms.

The IAO is composed of between from about 20 to about 98 wt. % branching, such as about 45 to about 80 wt. % branching, or from about 60 to about 70 wt. % branching and between from about 0.1 to about 30 wt. % residual alpha olefin, such as between from about 0.2 to about 20 wt. % residual alpha olefin, or between from about 0.5 to about 10 wt. % residual alpha olefin species.

In one embodiment, the IAO is composed of at least about 23% branching, at least about 9% residual alpha olefin, and having from about 20 to about 24 carbon atoms.

In another embodiment, the IAO is composed of at least about 65% branching, at least about 0.2-0.5 residual alpha olefin and having from about 20 to about 24 carbon atoms.

In one embodiment, when the percent branching in the partially isomerized alpha olefin is less than or equal to 25 weight percent, then the residual alpha olefin content in such partially isomerized alpha olefin is greater than or equal to 8 weight percent.

Further information on the isomerization and sulfonation of the surfactants discussed herein is disclosed in U.S. 2009/0151941, which is incorporated herein by reference.

With regard to M and X in the anionic surfactants, M and X are independently mono-valent cations, and may be independently selected from alkali metal, ammonium, and substituted ammonium.

An example of a secondary surfactant for slug 17 is "CS1500," which is produced by and available from Chevron Oronite Company LLC.

The secondary surfactant may be present in an amount of from about 0.1 to 3.0 weight percent actives, such as about 0.3 to about 2.0 wt. % actives, or about 0.5 wt. % to about 0.75 wt. % actives.

Suitable co-solvents are alcohols, such as lower carbon chain alcohols like isopropyl alcohol, ethanol, n-propyl alcohol, n-butyl alcohol, sec-butyl alcohol, n-amyl alcohol, sec-amyl alcohol, n-hexyl alcohol, sec-hexyl alcohol and the like; alcohol ethers, polyalkylene alcohol ethers, polyalkylene glycols, poly(oxyalkylene)glycols, poly(oxyalkylene)glycols ethers or any other common organic co-solvent or combinations of any two or more co-solvents. For example, in an embodiment, an ether, ethylene glycol butyl ether (EGBE), is used and typically is about 3 wt. % of slug 17. Generally, the co-solvent when used may be present in an amount of about 0.5 to about 6.0 weight percent of the solution, such as from about 1.0 to about 4.0 wt. %, or about 2.5 to about 3 wt. %.

EXAMPLES

Core flood experiments were conducted according to known laboratory methods utilizing five formulations of non-ionic, alkali-polymer solution or slug 17 utilizing different non-ionic chemicals for each experiment. Each core sample was waterflooded to irreducible oil saturations, which ranged from 24.6% to 39.5%. Following the waterflood, each core sample was flooded with slug 17.

Figure 4:
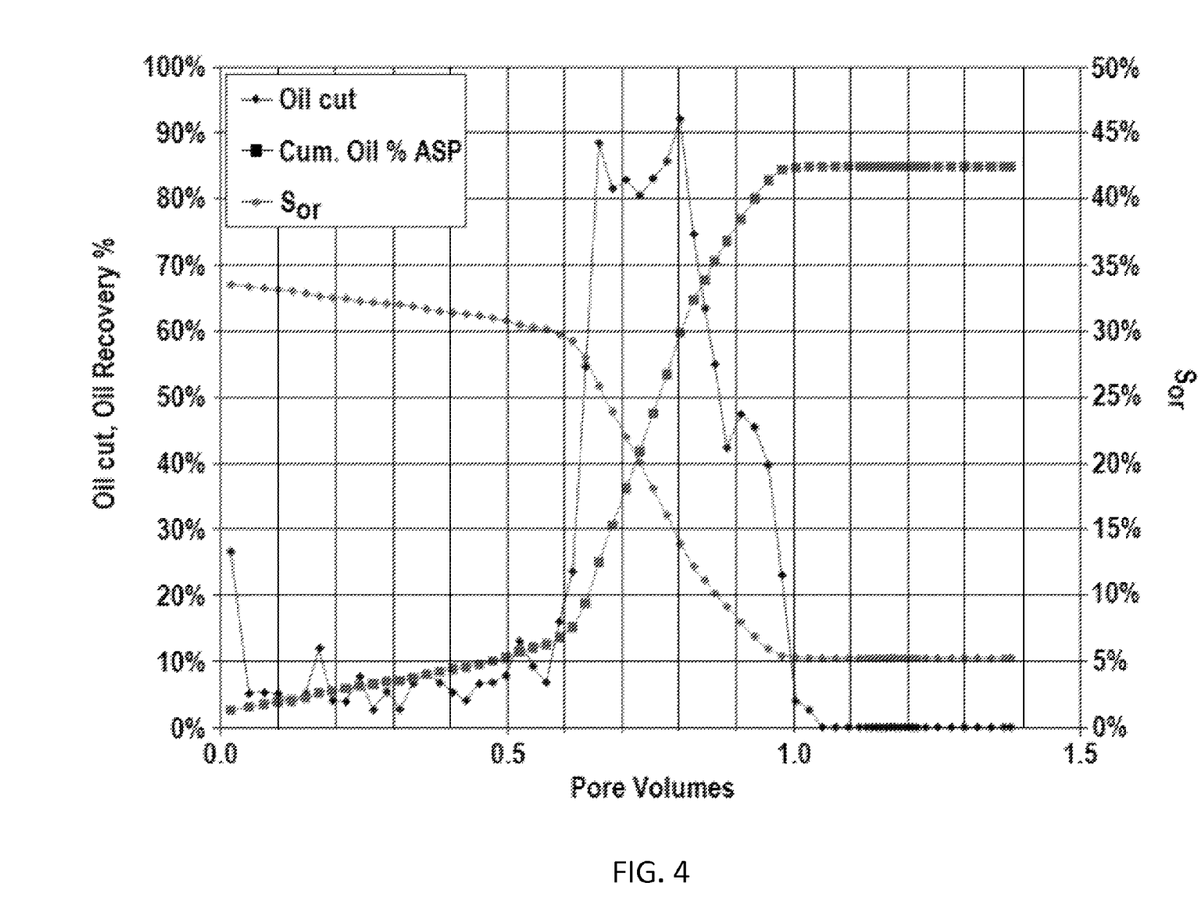
FIG. 4 is a graph of the oil cut, oil saturation, and cumulative oil recovery for pore volumes injected for a core flood experiment including the surfactant solution of Example A, in accordance with an embodiment of the present invention.
Figure 5:
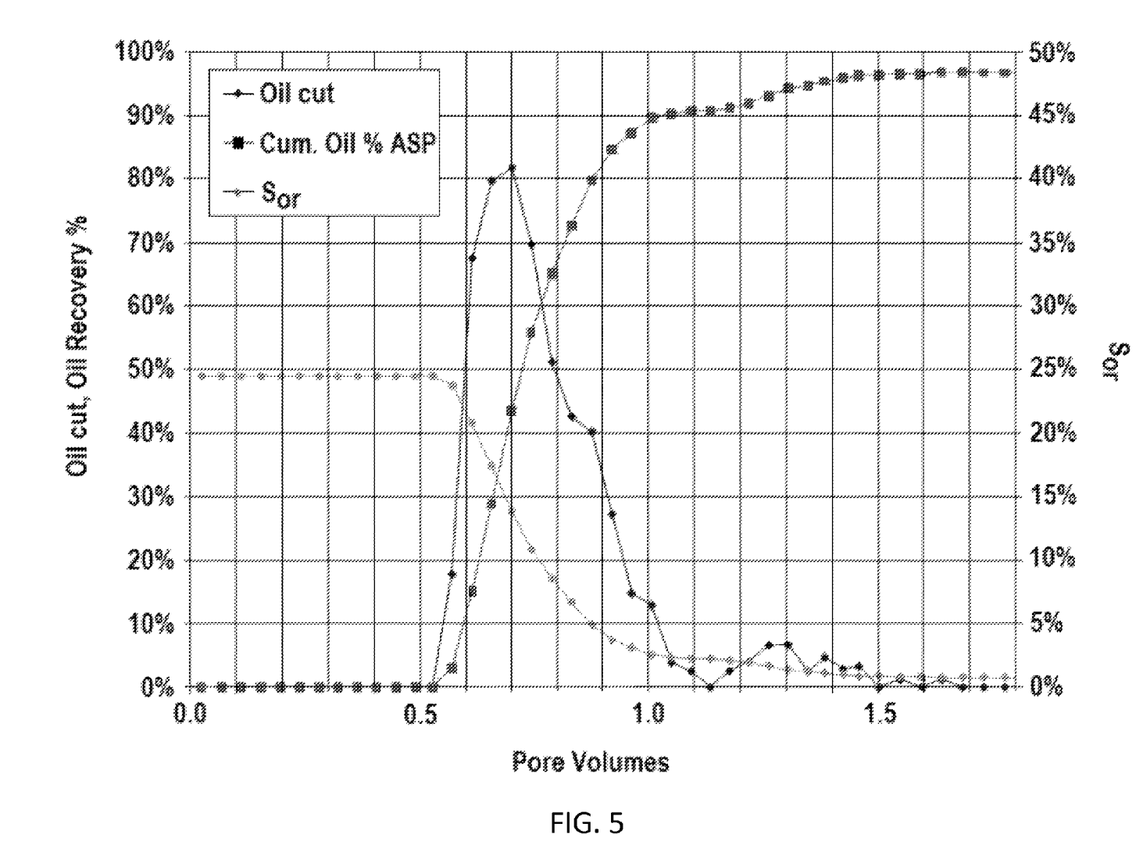
FIG. 5 is a graph of the oil cut, oil saturation, and cumulative oil recovery for pore volumes injected for a core flood experiment including the surfactant solution of Example B, in accordance with an embodiment of the present invention.
Figure 6:
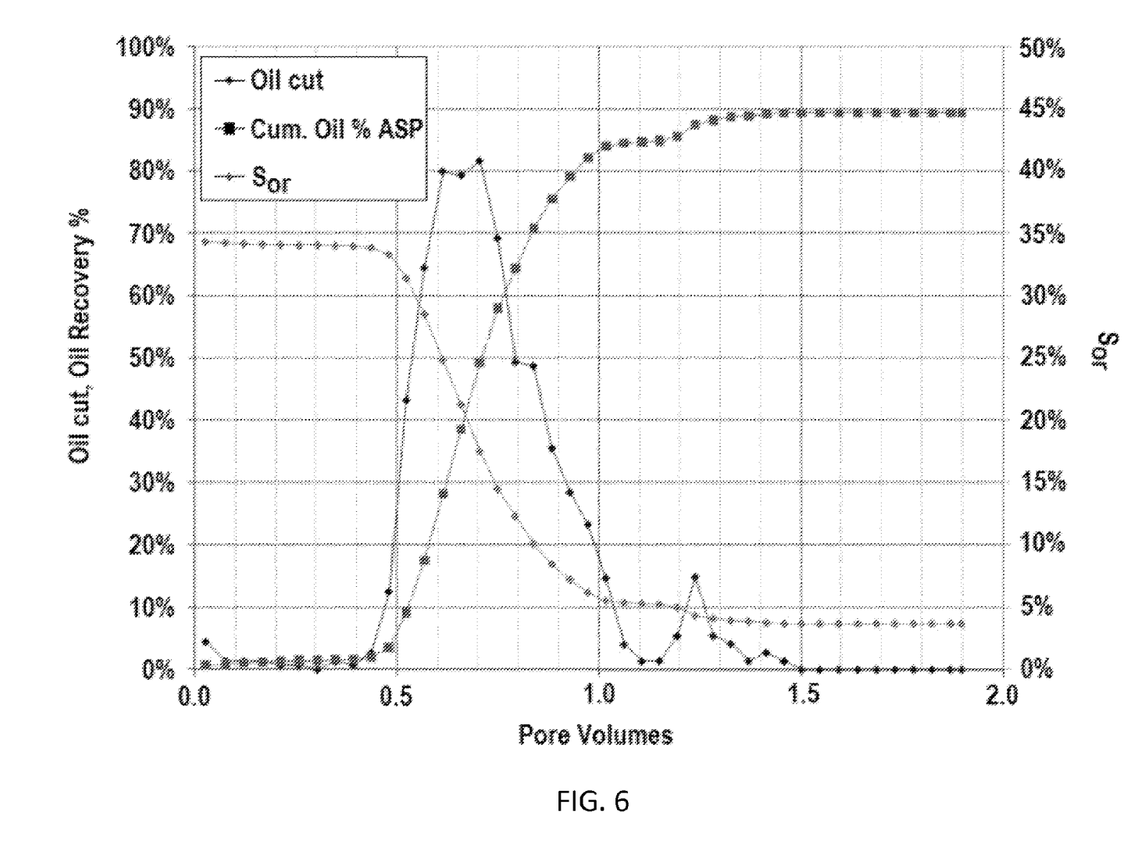
FIG. 6 is a graph of the oil cut, oil saturation, and cumulative oil recovery for pore volumes injected for a core flood experiment including the surfactant solution of Example D, in accordance with an embodiment of the present invention.
Figure 7:
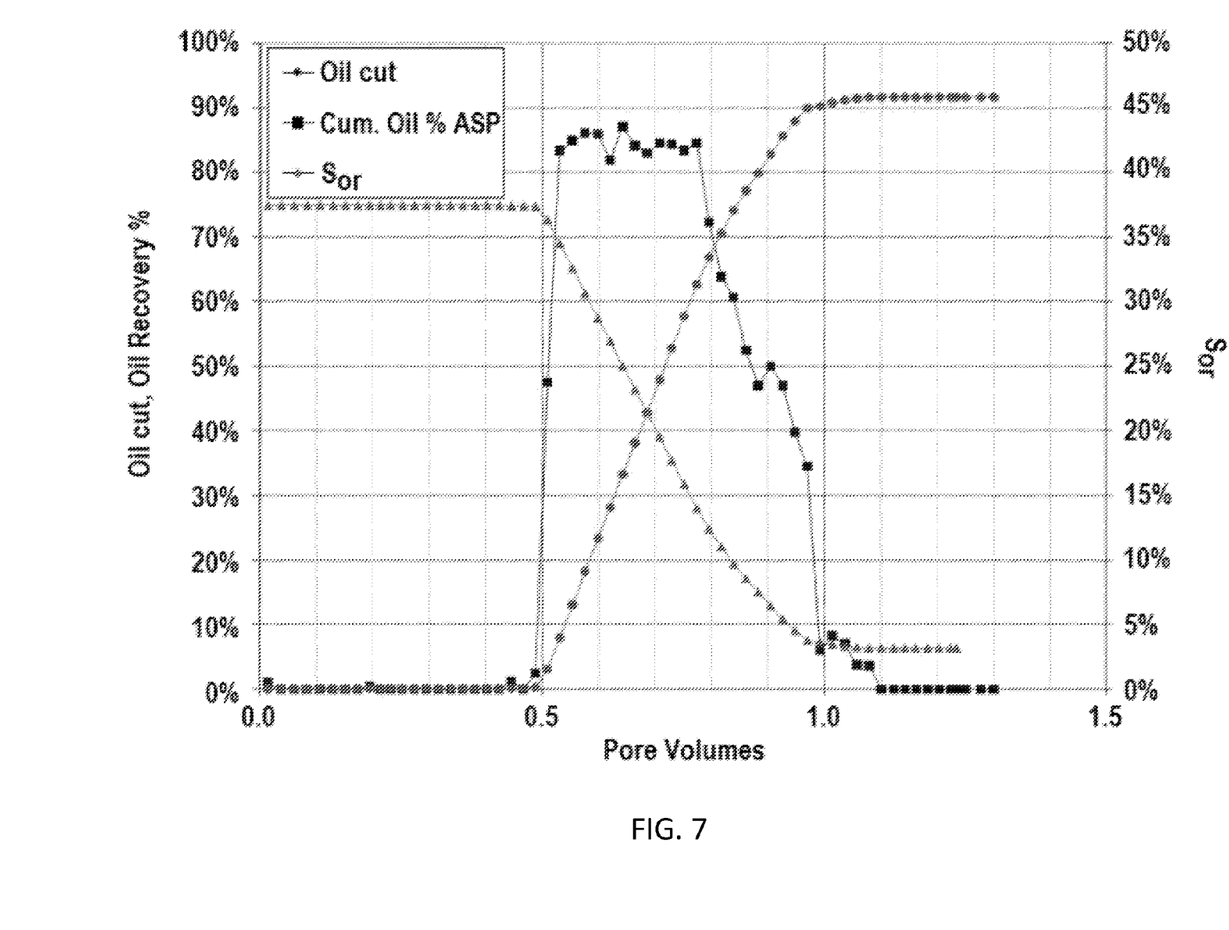
FIG. 7 is a graph of the oil cut, oil saturation, and cumulative oil recovery for pore volumes injected for a core flood experiment including the surfactant solution of Example E, in accordance with an embodiment of the present invention.

FIG. 4 shows the oil cut, oil saturation, and cumulative oil recovery for pore volumes injected of slug 17 for Experiment A. FIG. 5 shows the oil cut, oil saturation, and cumulative oil recovery for pore volumes injected of slug 17 for Experiment B. FIG. 6 shows the oil cut, oil saturation, and cumulative oil recovery for pore volumes injected of slug 17 for Experiment D. FIG. 7 shows the oil cut, oil saturation, and cumulative oil recovery for pore volumes injected of slug 17 for Experiment E.

In each of the core floods, the irreducible oil saturations after slug 17 were greatly reduced and cumulative oil recoveries were increased. The Table below reports the experimental results of each core flood:

| Experiment | $S_{or}$ After Waterflood | $S_{orc}$ After Slug 17 | Cum. Oil Rec. % |
|---|---|---|---|
| A | 39.50% | 4.20% | 89.0% |
| B | 24.6% | 0.8% | 96.9% |
| C | 35.9% | 4.9% | 95.6% |
| D | 39.5% | 3.7% | 89.4% |
| E | 37.5% | 3.1% | 91.6% |

In these five examples, the formulations of non-ionic, alkali-polymer solution or slug 17 were effective in reducing the oil saturation in core to less than five percent (<5%). Furthermore, each example resulted in a high cumulative oil recovery (≥89%), which is comparable to the performance of the top performing previously known surfactant systems but at a reduced total chemical requirement. Accordingly, the methods disclosed herein are able to successfully enhance oil recovery at a reduced cost.

While in the foregoing specification this invention has been described in relation to certain embodiments thereof, and many details have been set forth for purpose of illustration, it will be apparent to those skilled in the art that the invention is susceptible to alteration and that certain other details described herein can vary considerably without departing from the basic principles of the invention.

What is claimed is:
1. A method for enhancing oil recovery, comprising:
(a) providing a subsurface reservoir containing hydrocarbons therewithin;
(b) providing a wellbore in fluid communication with the subsurface reservoir;
(c) forming a solution for injection into the reservoir by mixing a composition with at least one non-ionic chemical, at least one polymer, and at least one alkali such that the solution is clear and aqueous stable, wherein a salinity of the solution formed is optimized for the subsurface reservoir by adjusting a number of alkoxylate groups in the non-ionic chemical; and (d) injecting the solution through the wellbore into the subsurface reservoir.

2. The method of claim 1, wherein the solution formed in step (c) comprises from about 0.05 to about 1.00 percent by weight non-ionic chemical based on the total weight of the solution.

3. The method of claim 1, wherein the solution formed in step (c) comprises from about 0.1 to about 0.3 percent by weight non-ionic chemical based on the total weight of the solution.

4. The method of claim 1, wherein the solution formed in step (c) is free of anionic surfactant.

5. The method of claim 1, wherein the solution formed in step (c) has a PV×C×10,000 from about 3 to about 15 units, where PV represents a dimensionless fraction of pore volumes injected, C represents a mass fraction of the non-ionic chemical, and 10,000 represents an arbitrary conversion factor.

6. The method of claim 1, wherein the solution formed in step (c) has a PV×C×10,000 from about 5 to about 10 units, where PV represents a dimensionless fraction of pore volumes injected, C represents a mass fraction of the non-ionic chemical, and 10,000 represents an arbitrary conversion factor.

7. The method of claim 1, wherein the non-ionic chemical is a non-ionic surfactant.

8. The method of claim 1, wherein the non-ionic chemical is an alcohol alkoxylate.

9. The method of claim 1, wherein the non-ionic chemical is selected from the group consisting of alkylaryl alkoxy alcohols and alkyl alkoxy alcohols.

10. The method of claim 1, wherein a chelating agent is added to the solution.

11. The method of claim 10, wherein the chelating agent is ethylenediaminetetraacetic acid (EDTA).

12. The method of claim 1, wherein the solution formed in step (c) has a cloud point temperature higher than the temperature within the subsurface reservoir.

13. The method of claim 1, wherein the solution formed in step (c) has a salt tolerance of at least 1.25 times the optimal salinity with alkali at a water-oil ratio of 9:1.

14. The method of claim 1, wherein the solution formed in step (c) has an interfacial tension (IFT) less than about 0.005 dynes/cm.

15. The method of claim 1, wherein the wellbore in step (b) is an injection wellbore associated with an injection well, and the method further comprises: providing a production well spaced-apart from the injection well a predetermined distance and having a production wellbore in fluid communication with the subsurface reservoir, wherein the injection of the solution in step (d) increases the flow of the hydrocarbons to the production wellbore.

16. The method of claim 1, wherein in step (d), the solution remains clear upon entering the subsurface reservoir.

17. The method of claim 1, further comprising injecting a chaser slug after injecting the solution in step (d).

18. A method for enhancing oil recovery from a subsurface reservoir in fluid communication with a wellbore comprising:

injecting a clear and aqueous stable solution through the wellbore into the reservoir, wherein the solution has a PV×C×10,000 from about 3 to about 15 units where PV represents a dimensionless fraction of pore volumes injected, C represents a mass fraction of the non-ionic chemical, and 10,000 represents an arbitrary conversion factor, and wherein the solution comprises at least one non-ionic chemical, at least one polymer, and at least one alkali.

19. The method of claim 18, wherein the solution comprises from about 0.05 to about 1.00 percent by weight non-ionic chemical based on the total weight of the solution.

20. The method of claim 18, wherein the non-ionic chemical is an alcohol alkoxylate.

21. The method of claim 18, wherein the non-ionic chemical is selected from the group consisting of alkylaryl alkoxy alcohols and alkyl alkoxy alcohols.

22. The method of claim 18, wherein the solution remains clear upon entering the subsurface reservoir.

23. The method of claim 18, further comprising injecting a chaser slug after injecting the solution.

24. A method for enhancing oil recovery from a subsurface reservoir in fluid communication with a wellbore comprising:

injecting a clear and aqueous stable solution through a wellbore into the reservoir, wherein the solution comprises at least one non-ionic chemical, at least one polymer, and at least one alkali, and wherein the solution comprises from about 0.1 to about 0.3 percent by weight non-ionic chemical based on the total weight of the solution.

25. The method of claim 24, wherein the solution has a PV×C×10,000 from about 3 to about 15 units, where PV represents a dimensionless fraction of pore volumes injected, C represents a mass fraction of the non-ionic chemical, and 10,000 represents an arbitrary conversion factor.

26. The method of claim 24, wherein the non-ionic chemical is an alcohol alkoxylate.

27. The method of claim 24, wherein the non-ionic chemical is selected from the group consisting of alkylaryl alkoxy alcohols and alkyl alkoxy alcohols.

28. The method of claim 24, wherein the solution remains clear upon entering the subsurface reservoir.

29. The method of claim 24, further comprising injecting a chaser slug through the wellbore into the reservoir after injecting the solution.

* * * * *